United States Patent [19]

Noguchi

[11] Patent Number: 4,806,753

[45] Date of Patent: Feb. 21, 1989

[54] LIGHT SCANNING DEVICE WITH A SHORT-PATH SYNCHRONIZING GRID

[75] Inventor: Masaru Noguchi, Kanagawa, Japan

[73] Assignee: Fuji Photo Film Co., Ltd., Kanagawa, Japan

[21] Appl. No.: 36,513

[22] Filed: Apr. 9, 1987

[30] Foreign Application Priority Data

Apr. 9, 1986 [JP] Japan .................................. 61-81827

[51] Int. Cl.[4] .............................................. H01J 3/14
[52] U.S. Cl. .................................. 250/235; 250/237 R
[58] Field of Search ............ 250/234, 235, 236, 237 R; 358/293, 294

[56] References Cited

U.S. PATENT DOCUMENTS

| | | | |
|---|---|---|---|
| 4,429,220 | 1/1984 | Noguchi | 250/236 |
| 4,490,608 | 12/1984 | Yeadon et al. | 358/293 |
| 4,616,132 | 10/1986 | Kessler | 358/293 |
| 4,647,145 | 3/1987 | Maeda et al. | 250/236 |
| 4,691,241 | 9/1987 | Tomohisa et al. | 358/293 |

Primary Examiner—David C. Nelms
Attorney, Agent, or Firm—Sughrue, Mion, Zinn, Macpeak, and Seas

[57] ABSTRACT

A scanning light beam is reflectively deflected by a light deflector in a main scanning direction substantially perpendicular to a subscanning direction in which an object surface to be scanned is moved. The deflected scanning light beam is passed through a scanning lens to scan the object surface in the main scanning direction. A synchronizing light beam is applied to the light deflector at a position where the scanning light beam is reflected thereby, in a direction allowing the synchronizing light beam that is reflectively deflected by the light deflector to be applied to the scanning lens. A converging lens is disposed on the optical path of the synchronizing light beam prior to application to the light deflector. The synchronizing light beam having left the scanning lens is passed through a grid and detected by a light detector assembly.

6 Claims, 2 Drawing Sheets

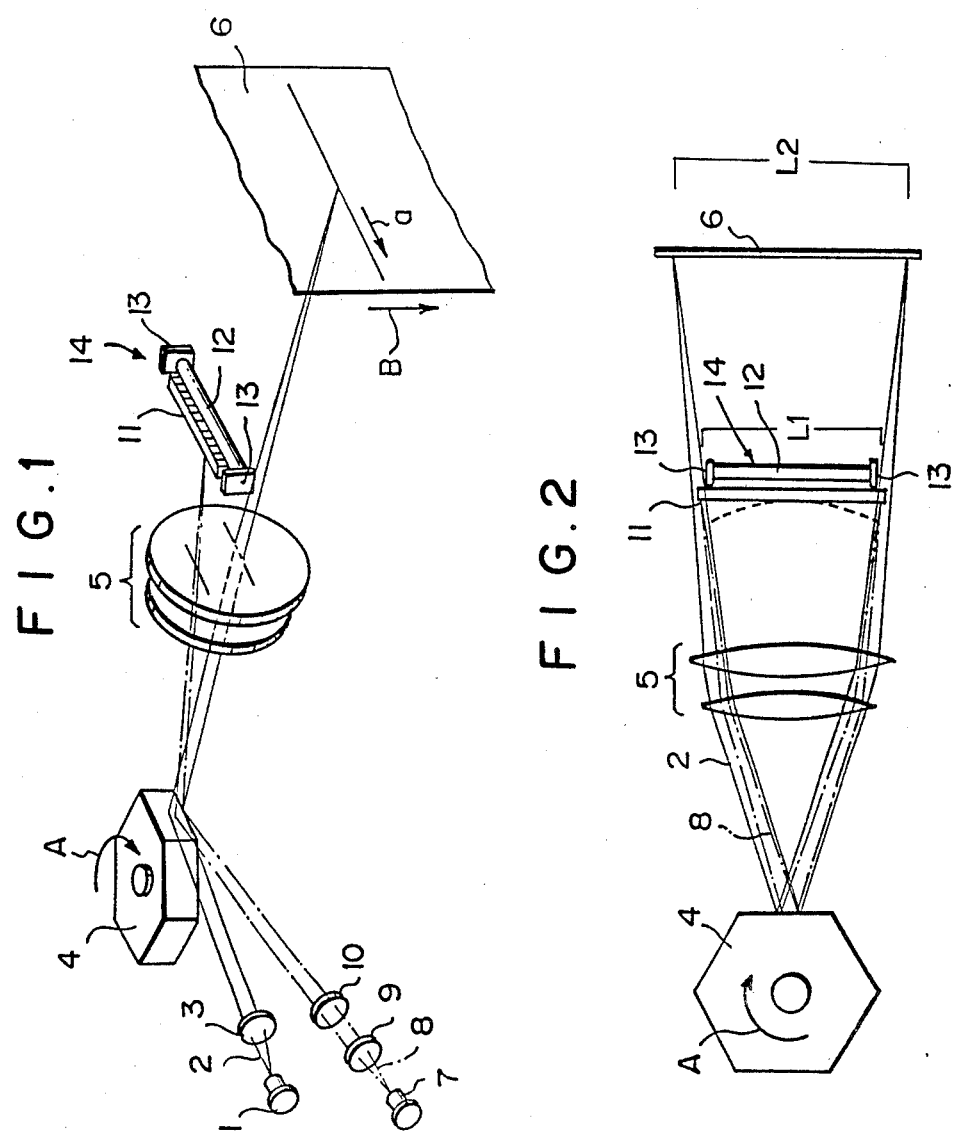

LIGHT SCANNING DEVICE WITH A SHORT-PATH SYNCHRONIZING GRID

BACKGROUND OF THE INVENTION

1. Field of the Invention

The present invention relates to a light scanning device, and more particularly to a light scanning device including a light deflector for deflecting a scanning light beam employed to scan a desired surface and a synchronizing light beam employed to produce a synchronizing signal.

2. Description of the Prior Art

Recent years have seen the development of various light scanning devices for reading out and/or recording images with a light beam. In such light scanning devices, a light beam produced by a light source is reflectively deflected by a light deflector such as a rotating polygonal mirror to scan a desired object surface one-dimensionally in a main scanning direction. At the same time, the object surface is moved at a constant speed in a subscanning direction which is substantially normal to the main scanning direction, the net result being two-dimensional scanning of the object surface. These light scanning devices employ a synchronizing light beam, in addition to the above light beam for scanning the object surface (scanning light beam), to generate a synchronizing signal so that scanning distortions or irregularities in the main scanning direction can be corrected.

With the conventional light scanning devices, the scanning light beam and the synchronizing light beam are produced generally by applying one or two light beams to the light deflector, applying the light beam or beams reflectively deflected by the light deflector to a scanning lens, and then picking up the light beam or beams that have left the scanning lens at mutually conjugate planes. Where only one light beam is applied to the light deflector, the light beam having left the scanning lens is divided into two light beams by a half-silvered mirror or the like. The synchronizing light beam thus produced is then applied to a grid positioned where the synchronizing light beam is converged and extending in the main scanning direction. The light beam that has passed through the grid is detected by a light detector disposed behind the grid. Since the synchronizing light beam and the scanning light beam are converged by the same scanning lens, however, the optical paths for the synchronizing and scanning light beams are equal to each other. The scanning widths traversed by the scanning and synchronizing light beams are also equal to each other. Therefore, the grid and the light detector which are located at the converging point of the synchronizing light beam are required to have at least the same length as the main scanning width on the object surface being scanned. As a result, the light scanning devices with the means for generating the synchronizing light beam in the above manner need a space therein to establish the optical length for the synchronizing light beam. Moreover, the overall light beam scanning device is large in size because of the elongate grid and light detector.

SUMMARY OF THE INVENTION

In view of the aforesaid problems of the conventional light scanning devices, it is an object of the present invention to provide a light scanning device of a smaller size in which the optical path for a synchronizing light beam that generates a synchronizing signal is shortened, and the lengths of a grid and a light detector are reduced.

According to the present invention, there is provided a light scanning device for two-dimensionally scanning an object surface which moves in a subscanning direction, comprising a first light source for emitting a scanning light beam, a light deflector for reflectively deflecting the scanning light beam in a main scanning direction substantially perpendicular to the subscanning direction, a scanning lens for converging the deflected scanning light beam to scan the object surface in the main scanning direction, a second light source for applying a synchronizing light beam to the light deflector at a position where the scanning light beam is reflected thereby, in a direction allowing the synchronizing light beam that is reflectively deflected by the light deflector to be applied to the scanning lens, a converging lens disposed on the optical path of the synchronizing light beam prior to application to the light deflector, a grid disposed in a position where the synchronizing light beam is converged by the scanning lens and the converging lens and extending in the main scanning direction, and light detecting means disposed behind the grid for detecting the synchronizing light beam that has passed through the grid.

Since the synchronizing light beam is converged by the scanning lens and the converging lens, it is converged in a position closer to the light deflector than the scanning light beam after having been deflected by the light deflector. Therefore, the optical length of the synchronizing light beam is smaller than the optical length of the scanning light beam. The scanning width of the synchronizing light beam is smaller than the scanning line of the scanning light beam in the main scanning direction, with the result that the grid and the light detecting means may be shorter than those of the conventional light scanning device. The synchronizing light beam may applied to the light deflector in a direction inclined to the main scanning light beam, and pass through an optical path different from that of the scanning light beam. Alternatively, the scanning and synchronizing light beams may be combined into a single light beam, which may thereafter be divided again by means of dichroic mirrors, for example.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a schematic perspective view of a light scanning device according to an embodiment of the present invention, FIG. 2 is a plan view of the light scanning device shown in FIG. 1.

DESCRIPTION OF THE PREFERRED EMBODIMENTS

Figure 3:
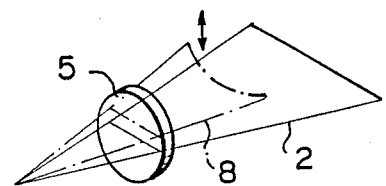
FIG. 3 is a perspective view explaining the manner in which a scanning line produced by a synchronizing light beam is made below shaped.

FIG. 1 schematically shows a light scanning device according to an embodiment of the present invention.

The light scanning device includes a first semiconductor laser 1 which generates a scanning light beam 2. The emitted scanning light beam 2 is applied to a collimator lens 3 and converted thereby to a parallel-ray light beam 2 which is then reflectively deflected by a light deflector comprising a polygonal mirror 4 that rotates about its own axis in the direction of the arrow A. The deflected light beam 2 is applied to an fθ lens 5 positioned in the optical path, and is converged by the fθ lens 5 on a flat object surface 6 which is moved in the direction of the arrow B (subscanning direction). The light beam 2 as it is deflected by the rotating polygonal mirror 4 scans the object surface 6 in a main scanning direction (indicated by the arrow a) while the object surface 6 is being scanned in the subscanning direction, with the result that the object surface 6 is two-dimensionally scanned. The fθ lens 5 serves as a scanning lens for scanning the flat object surface 6 at a constant speed with the scanning light beam 2 which is deflected by the rotating polygonal mirror 4 at a constant angular speed.

The light scanning device also includes a second semiconductor laser 7 which generates a synchronizing light beam 8 that is applied to the rotating polygonal mirror 4 in a position where the scanning light beam 2 is reflected thereby. The synchronizing light beam 8 is displaced from the scanning light beam 2 along the drive shaft of the rotating polygonal mirror 4 and directed obliquely upwardly from the second semiconductor laser 7 toward the rotating polygonal mirror 4. The synchronizing light beam 8 is converted to a parallel-ray synchronizing light beam by a collimator lens 9 disposed in the optical path, and the parallel-ray beam 8 is converged by a converging lens 10 before being applied to the rotating polygonal mirror 4. The synchronizing light beam 8 reflectively deflected by the rotating polygonal mirror 4 is directed obliquely upwardly of the scanning light beam 2 reflected by the rotating polygonal mirror 4, and is then converged by the fθ lens 5. The synchronizing light beam 8 is therefore converged by the converging lens 10 and the fθ lens 5. The position where the synchronizing light beam 8 is converged is closer to the rotating polygonal mirror 4 than the position where the scanning light beam 2 is converged. Therefore, the optical length of the synchronizing light beam 8 is smaller than the optical length of the scanning light beam 2. At the same time, as shown in FIG. 2, the scanning width L1 of the synchronizing light beam 8 is smaller than the scanning width L2 of the scanning light beam 2. The light scanning device has a grid 11 disposed in the converging position of the synchronizing light beam 8 and extending in the main scanning direction. Thus, the converged synchronizing light beam 8 is applied to the grid 11 as it is scanned in the main scanning direction. The synchronizing light beam 8 which has passed through the grid 11 is collected by a light guide bar 12 positioned behind the grid 11. The collected light is detected by light detectors 13 disposed at the opposite ends, respectively, of the light guide bar 12. The light guide bar 12 and the light detectors 13 jointly constitute a light detecting means 14 for detecting a scanning position and producing a synchronizing signal.

The grid 11 and the light detecting means 14 are required to have widths or dimensions in the main scanning direction which are larger than the scanning width L1 of the synchronizing light beam 8 in order to detect the synchronizing light beam 8 in its entirety. Since the scanning width L1 is smaller than the scanning width of the scanning light beam 2, the grid 11 and the light detecting means 14 can be relatively short. Therefore, the light scanning device of the invention is of a compact size as the grid 11 and the light detecting means 14 are small in size. The light detecting means 14 is not limited to the light guide bar 12 and the light detectors 13, but may be a number of light detecting elements disposed directly behind the grid 11.

The synchronizing light beam 8 is applied as a converging light beam to the fθ lens 5, and does not pass through a plane containing the optical axis of the fθ lens 5. For these reasons, various adjustments are required to obtain an accurate synchronizing signal. More specifically, an fθ lens is normally adjusted to provide desired optical characteristics when a light beam applied thereto is a collimated parallel-ray beam and deflected in a plane containing the optical axis of the fθ lens. Hence, various errors tend to occur if the applied light beam is a converging light beam and deflected in a plane other than the plane containing the optical axis of the fθ lens. For example, where the synchronizing light beam 8 is obliquely applied to the fθ lens 5 at a position spaced from the central area of the lens 5, as shown in FIG. 1, not every portion of the synchronizing light beam 8 is accurately focused on the grid 11, but the locus of focused positions of the synchronizing light beam 8 is curved as indicated by the dotted line in FIG. 2. Such a phenomenon is known as a "curvature of field". If the curvature of field is large, it is preferable to curve the grid 11 in complementary relation to the curvature of field. Moreover, where the synchronizing light beam 8 is obliquely applied to the fθ lens 5, the locus of focused positions is also curved vertically in a plane parallel to the fθ lens 5, as shown in FIG. 3, with the result that the scanning line formed by the synchronizing light beam 8 is bow-shaped. To compensate for this, the grid 11 may have an increased vertical width or be positionally adjusted to cover the entire bow-shaped scanning line, so that the synchronizing light beam 8 can be applied to the grid 11 no matter where the synchronizing light beam 8 may be positioned on the scanning line thereof.

Figure 4:
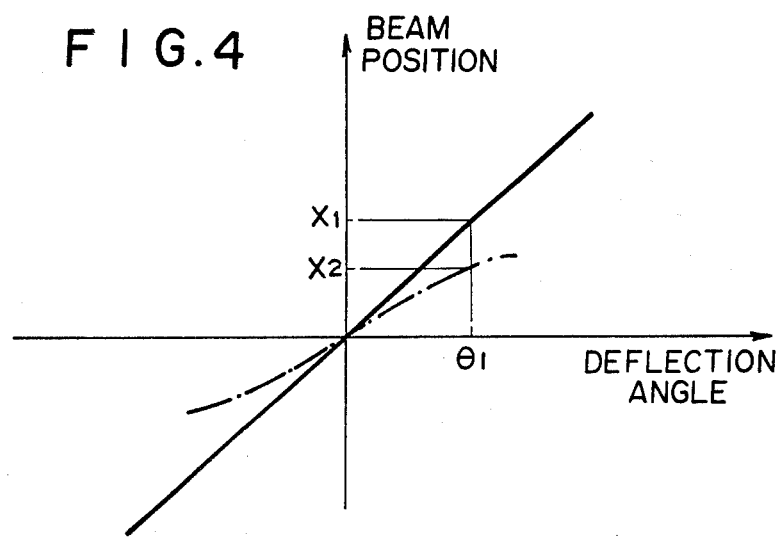
FIG. 4 is a graph illustrating the relationship between the deflection angle of a rotating polygonal mirror and the scanning positions of scanning and synchronizing light beams.

In addition to the above problems of a curvature of field and a bow-shaped scanning line, the synchronizing light beam fails to provide fθ characteristics if it is a converging light beam and applied obliquely to the fθ lens at a position off its center. More specifically, the fθ lens 5 is adjusted to enable the scanning light beam 2, which is deflected at a constant angular speed by the rotating polygonal mirror 4 and applied as a collimated parallel-ray light beam to a desired position on the fθ lens 5, to scan the flat object surface 6 at a constant speed. The deflection angle of the rotating polygonal mirror 4 and the beam position of the scanning light beam 2 in the main scanning direction are substantially proportional to each other as shown by the solid line in FIG. 4. However, since the above fθ property of the fθ lens 5 is not effective with respect to the synchronizing light beam 8, the deflection angle of the rotating polygonal mirror 4 and the beam position of the synchronizing light beam 8 in the main scanning direction are not proportional to each other as indicated by the dot-and-dash line in FIG. 4. That is, when the deflection angle θ varies at equal intervals, the position of the scanning light beam is varied at equal intervals, but the position of the synchronizing light beam is varied at unequal intervals. Therefore, a synchronizing signal directly obtained from the synchronizing light beam with its beam position thus varied would be inaccurate. Inasmuch as, however, the curve or locus of such varying positions of the synchronizing light beam 8 can be determined in advance according the characteristics of the fθ lens 5, the relationship between positions x1, x2 of the scanning and synchronizing light beams at a deflection angle θ1 can be obtained from the predetermined curve or locus, and the grid 11 can be arranged to have irregular pitches for producing an accurate synchronizing signal based on the synchronizing light beam.

Figure 5:
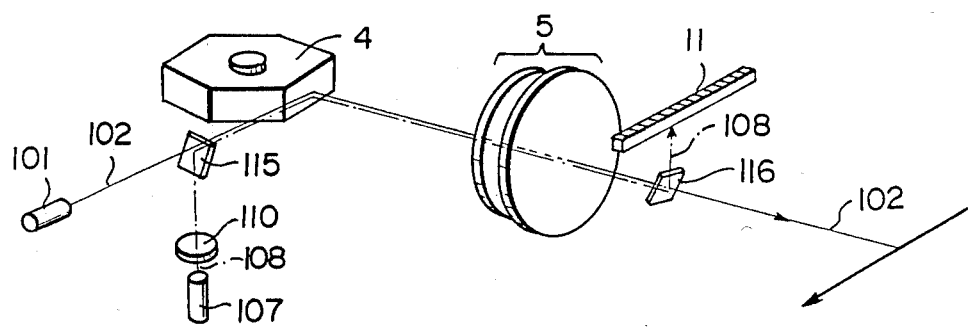
FIG. 5 is a schematic perspective view of a light scanning device according to another embodiment of the present invention.

While in the above embodiment the scanning light beam and the synchronizing light beam are generated by the semiconductor lasers, the light beams may be generated by other types of lasers. The scanning light beam and the synchronizing light beam may be produced by dividing a single light beam from one light source into two light beams with a half-silvered mirror. Where the light scanning device is used as a scanning recording device, a modulator for modulating a scanning light beam is disposed on the optical path of the scanning light beam which has been divided from a common light beam. The light deflector may comprise a galvanometer mirror or the like rather than the rotating polygonal mirror. The converging lens may be disposed on the optical path of the synchronizing light beam after it has been deflected by the rotating polygonal mirror.

Where light beams of different wavelengths are employed as the scanning light beam and the synchronizing light beam, these two light beams may be applied as a single light beam to the rotating polygonal mirror. More specifically, according to another embodiment as shown in FIG. 5, a scanning light beam 102 emitted from a scanning light source 101 and a synchronizing light beam 108 emitted from a synchronizing light source 107 are applied in mutually perpendicular directions to a dichroic mirror 115 which passes light having the wavelength of the scanning light beam 102 and reflects light having the wavelength of the synchronizing light beam 108, and are combined by the dichroic mirror 115 into a single light beam. A converging lens 110 is positioned in the optical path of the synchronizing light beam 108 before it is applied to the dichroic mirror 115. The combined light beam is reflectively deflected by the rotating polygonal mirror 4 and then applied to the fθ lens 5. The light beam having passed through the fθ lens 5 is applied to a dichroic mirror 116 which passes light of the wavelength of the scanning light beam 102 and reflects light of the wavelength of the synchronizing light beam 108. The light beam is divided again by the dichroic mirror 116 into the scanning light beam 102 which is applied to scan the object surface and the synchronizing light beam 108 which is applied to the grid 11 disposed on the optical path thereof. Light beams having mutually perpendicular directions of polarization may be employed as the synchronizing and scanning light beams, and the dichroic mirrors shown in FIG. 5 may be replaced with polarization beam splitters for combining and dividing those light beams in the arrangement of FIG. 5.

Although certain preferred embodiments have been shown and described, it should be understood that many changes and modifications may be made therein without departing from the scope of the appended claims.

I claim:

1. A light scanning device for two-dimensionally scanning an object surface which moves in a subscanning direction, comprising:
   (i) a first light source for emitting a scanning light beam;
   (ii) a light deflector for reflectively deflecting the scanning light beam in a main scanning direction substantially perpendicular to the subscanning direction;
   (iii) a scanning lens for converging the deflected scanning light beam to scan the object surface in the main scanning direction;
   (iv) a second light source for applying a synchronizing light beam to said light deflector at a position where the scanning light beam is reflected thereby, in a direction allowing the synchronizing light beam that is reflectively deflected by said light deflector to be applied to said scanning lens;
   (v) a converging lens disposed on the optical path of said synchronizing light beam prior to application to said light deflector for converging said synchronizing light beam at an optical length from said light deflector shorter than the optical length between the light deflector and the object surface whereby the scanning length of the synchronizing light beam is shorter than the scanning length of the scanning light beam in the main scanning direction;
   (vi) a grid shorter than the scanning length of the scanning light beam in the beam scanning direction disposed in a position where said synchronizing light beam is converged by said scanning lens and said converging lens and extending in said main scanning direction; and
   (vii) light detecting means disposed behind said grid for detecting the synchronizing light beam of shorter scanning length than that of the scanning light beam that has passed through said grid.

2. A light scanning device according to claim 1, wherein said light deflector has a drive shaft, said synchronizing light beam being applied to said light deflector as displaced from said scanning light beam along said drive shaft.

3. A light scanning device according to claim 1, further including first means for combining said scanning light beam and said synchronizing light beam into a single light beam prior to application to said light deflector and second means for dividing said single light beam into said scanning light beam and said synchronizing light beam after having left said scanning lens.

4. A light scanning device according to claim 3, wherein each of said first and second means comprises a dichroic mirror for passing said scanning light beam therethrough and reflecting said synchronizing light beam.

5. A light scanning device according to claim 1, wherein said light detecting means comprises a light guide bar and a pair of light detectors disposed on opposite ends of said light guide bar.

6. A light scanning device according to claim 1, wherein the locus of the varying positions where the synchronizing light beam converges is determined in advance according to the characteristics of the scanning lens, and the relationship between the positions of the scanning and synchronizing light beams at a deflection angle is obtained from the predetermined locus, said grid being provided with irregular pitches for producing an accurate synchronizing signal based on the synchronizing light beam.

* * * * *